United States Patent
Amann et al.

(10) Patent No.: US 12,344,088 B2
(45) Date of Patent: Jul. 1, 2025

(54) DRIVE DEVICE FOR AN ELECTRICALLY DRIVABLE MOTOR VEHICLE, AND MOTOR VEHICLE

(71) Applicant: Bayerische Motoren Werke Aktiengesellschaft, Munich (DE)

(72) Inventors: Norbert Amann, Munich (DE); David Bock, Carterton (GB); Christophe Lafaye, Vaterstetten (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/768,267

(22) PCT Filed: Nov. 4, 2020

(86) PCT No.: PCT/EP2020/080866
§ 371 (c)(1),
(2) Date: Apr. 12, 2022

(87) PCT Pub. No.: WO2021/110339
PCT Pub. Date: Jun. 10, 2021

(65) Prior Publication Data
US 2024/0131924 A1  Apr. 25, 2024
US 2024/0227549 A9  Jul. 11, 2024

(30) Foreign Application Priority Data
Dec. 3, 2019  (DE) ............... 10 2019 132 776.8

(51) Int. Cl.
*H02K 11/33*  (2016.01)
*B60K 1/02*  (2006.01)
(Continued)

(52) U.S. Cl.
CPC .............. *B60K 17/22* (2013.01); *B60K 1/02* (2013.01); *H02K 7/006* (2013.01); *H02K 11/33* (2016.01); *B60Y 2400/61* (2013.01)

(58) Field of Classification Search
CPC ........ B60K 17/22; B60K 1/02; B60K 7/0007; B60K 2007/0076; H02K 7/006; H02K 7/10; H02K 11/33; B60Y 2304/01
See application file for complete search history.

(56) References Cited

U.S. PATENT DOCUMENTS

| 6,166,498 A | 12/2000 | Yamaguchi et al. |
| 8,875,825 B2 * | 11/2014 | Asakura ................ B60K 6/405 310/52 |

(Continued)

FOREIGN PATENT DOCUMENTS

| CN | 102130534 A | 7/2011 |
| CN | 104302506 A | 1/2015 |

(Continued)

OTHER PUBLICATIONS

International Search Report (PCT/ISA/210) issued in PCT Application No. PCT/EP2020/080866 dated Mar. 24, 2021 with English translation (eight (8) pages).

(Continued)

*Primary Examiner* — Steve Clemmons
(74) *Attorney, Agent, or Firm* — Crowell & Moring LLP

(57) ABSTRACT

A drive device has two electric drive machines for distributing the torque between two wheels of an axle of a motor vehicle and an inverter unit which is electrically connected to the drive machines for converting an electrical DC signal into a drive-machine-specific electrical AC signal. The two drive machines are arranged spaced apart from one another in the axial direction to form an intermediate space, and components of the inverter unit are arranged in a first area, located in the intermediate space and oriented in a first (Continued)

direction transversely with respect to the axial direction, of the drive device, and in a second area, adjoining the intermediate space and oriented parallel to the axial direction, of the drive device, to form a low-inductance, T-shaped inverter architecture.

10 Claims, 3 Drawing Sheets

(51) Int. Cl.
 *B60K 17/22* (2006.01)
 *H02K 7/00* (2006.01)

(56) References Cited

U.S. PATENT DOCUMENTS

| | | | |
|---|---|---|---|
| 9,511,660 B2 | 12/2016 | Braun et al. | |
| 9,566,851 B2* | 2/2017 | Kawamura | B60L 3/0007 |
| 9,821,650 B2* | 11/2017 | Falls | B60K 11/02 |
| 10,336,178 B2* | 7/2019 | Albl | F16H 37/0826 |
| 10,486,512 B2* | 11/2019 | Bassis | B60K 17/354 |
| 10,773,581 B2* | 9/2020 | Scharlach | B60K 1/00 |
| 11,165,308 B2* | 11/2021 | Albl | H02K 1/185 |
| 11,588,423 B2 | 2/2023 | Yamada | H02K 9/227 |
| 2009/0243443 A1* | 10/2009 | Aoki | H02K 11/05 |
| | | | 310/68 D |
| 2011/0094807 A1 | 4/2011 | Pruitt et al. | |
| 2011/0259657 A1* | 10/2011 | Fuechtner | B60K 7/0007 |
| | | | 903/902 |
| 2012/0329594 A1 | 12/2012 | Sada et al. | |
| 2014/0202781 A1 | 7/2014 | Soma et al. | |
| 2016/0052380 A1 | 2/2016 | Miyazawa et al. | |
| 2016/0185232 A1* | 6/2016 | Suzuki | B60K 31/06 |
| | | | 903/945 |
| 2016/0311310 A1 | 10/2016 | Muenst | |
| 2018/0035573 A1 | 2/2018 | Taguchi et al. | |
| 2018/0339583 A1 | 11/2018 | Hirai | |
| 2019/0123665 A1 | 4/2019 | Apelsmeier et al. | |
| 2020/0274462 A1 | 8/2020 | Schiedermeier et al. | |

FOREIGN PATENT DOCUMENTS

| | | |
|---|---|---|
| CN | 106068197 A | 11/2016 |
| CN | 107650670 A | 2/2018 |
| CN | 109698643 A | 4/2019 |
| CN | 111591147 A | 8/2020 |
| CN | 114571971 A | 6/2022 |
| DE | 699 34 728 T2 | 10/2007 |
| DE | 10 2010 032 106 A1 | 1/2012 |
| DE | 20 2013 011 046 U1 | 4/2015 |
| DE | 11 2014 001 863 T5 | 12/2015 |
| DE | 10 2020 129 729 A1 | 5/2022 |
| EP | 3352345 A1 * | 7/2018 |
| WO | WO-2020001860 A1 * | 1/2020 |

OTHER PUBLICATIONS

German-language Written Opinion (PCT/ISA/237) issued in PCT Application No. PCT/EP2020/080866 dated Mar. 24, 2021 (ten (10) pages).

German-language Search Report issued in German Application No. 10 2019 132 776.8 dated Jun. 21, 2021 with partial English translation (18 pages).

Chinese-language Office Action issued in Chinese Application No. 202080064576.8 dated Nov. 20, 2023 with English translation (19 pages).

* cited by examiner

DRIVE DEVICE FOR AN ELECTRICALLY DRIVABLE MOTOR VEHICLE, AND MOTOR VEHICLE

BACKGROUND AND SUMMARY OF THE INVENTION

The invention relates to a drive device for an electrically drivable motor vehicle. The drive device has at least one pair of drive machines comprising two electric drive machines for distributing torque between two wheels of an axle of the motor vehicle and also has an inverter unit, which is connected to the drive machines, for converting an electrical DC signal, which is provided by an energy provision unit of the motor vehicle, into a drive machine-specific electrical AC signal. The invention also relates to an electrically drivable motor vehicle.

At present, the focus of interest is on electrically drivable motor vehicles, that is to say hybrid or electric vehicles, with drive devices capable of torque distribution. Drive devices of this kind have at least one pair of drive machines comprising two drive machines for torque distribution, also referred to as "torque vectoring" or "active yaw", wherein each drive machine acts on a wheel of an axle, for example a rear axle, of the motor vehicle. In order to convert an electrical DC signal, which is provided by an energy provision unit, for example a traction battery, into a drive machine-specific electrical AC signal, the drive device has an inverter unit which is electrically connected to the energy provision unit and also to the drive machines via busbars. If the inverter unit is arranged physically spaced apart and therefore far away from the drive machines, the long signal routing via the busbars results in a high inductance in the drive device.

The object of the present invention is to provide an installation space-saving drive device with low-inductance signal routing.

This object is achieved by the claimed invention.

A drive device according to an embodiment of the invention for an electrically drivable motor vehicle has at least one pair of drive machines comprising two electric drive machines for distributing torque between two wheels of an axle of the motor vehicle. In addition, the drive device has an inverter unit, which is connected to the drive machines, for converting an electrical DC signal, which is provided by an energy provision unit of the motor vehicle, into a drive machine-specific electrical AC signal. The two drive machines are arranged next to one another or spaced apart from one another in the axial direction so as to form an intermediate space. Components of the inverter unit are arranged in a first region, which is located in the intermediate space and is oriented in a first direction transversely with respect to the axial direction, of the drive device and in a second region, which adjoins the intermediate space and is oriented parallel to the axial direction, of the drive device so as to form a low-inductance, T-shaped inverter architecture.

The invention also relates to an electrically drivable motor vehicle having a drive device according to an embodiment of the invention. The motor vehicle, which is in the form of an electric or hybrid vehicle, is a passenger car in particular. The axle on which the drive device is arranged is, for example, a rear axle of the motor vehicle. In this case, the axial direction, that is to say the direction of extent of the axle, corresponds to a vehicle transverse direction.

The drive device is capable of torque distribution and is designed to provide wheel-specific torques or drive torques. This means that the drive device is designed to provide different drive torques for the wheels. For this purpose, the drive device has two drive machines, wherein a first drive machine is designed to provide torque for a first wheel of the axle, for example a right-hand-side rear wheel, and a second drive machine is designed to provide torque for a second wheel of the axle, for example a left-hand-side rear wheel. The electric drive machines are, in particular, structurally identical, n-phase, for example three-phase, drive machines. Drive machines of this kind can be, for example, three-phase machines in the form of permanent-magnet synchronous machines.

The drive machines are arranged spaced apart from one another along the axial direction. In particular, the drive machines are arranged symmetrically in relation to one another with respect to an axis center through which a vehicle longitudinal axis runs if the axial direction corresponds to a vehicle transverse direction. In other words, the drive machines are arranged symmetrically in relation to the vehicle longitudinal axis. In so doing, the drive machines form an intermediate space between them.

The inverter unit is preferably a 2*n-phase, for example a six-phase, inverter. The inverter is designed, in particular, to convert a direct current, which is provided by the energy provision unit, into an alternating current for energizing phase windings of the drive machines. The inverter has, in particular, first components, which can be used by both drive machines, and drive machine-specific second components. In this case, the components of the inverter unit are arranged in a T-shape. This means that some components are arranged in the first region between the drive machines and some components are arranged in the second region outside the intermediate space. In this case, the first and the second region are arranged in a T-shape. The first region extends in the first direction transversely in relation to the axial direction and the second region extends along the axial direction, for example in the vehicle transverse direction. The first direction corresponds, in particular, to a vehicle vertical direction.

The components in the first region are arranged, in particular, centrally between the drive machines and in a line along the first direction, for example along the vehicle vertical direction, whereas the components in the second region are arranged in a line along the axial direction, for example along the vehicle transverse direction. The first, jointly usable or collective components are preferably arranged in the first region of the drive device. For example, the jointly usable first components are a filter unit and/or a DC link capacitor unit and/or a plug-in connector for connection to the energy provision unit. For example, the plug-in connector, the filter unit and the DC link capacitor unit are arranged along the vehicle vertical direction and are connected to one another via busbars. The filter unit is, in particular, a DC filter and the plug-in connector is, in particular, a DC plug.

The second, drive-specific or independent components are arranged, in particular, in the second region of the drive device. The drive machine-specific second components are preferably power modules for converting the electrical DC signal, which is provided by the energy provision unit, into the electrical AC signal for the drive machines. A first of the power modules for the first drive machine is arranged, in particular, on a side of the second region that faces the first drive machine and a second of the power modules for the second drive machine is arranged, in particular, on a side of the second region that faces the second drive machine. The power modules are electrically connected to the first components of the first region, that is to say for example the DC link capacitor unit and the filter unit, via busbars and can convert the DC signal, which is transmitted via the first components, of the energy provision unit into a three-phase AC signal, for example a three-phase current. For this purpose, the power modules can have a large number of controllable circuit breakers.

Since the components of the inverter unit are partially arranged in the intermediate space between the drive machines, the drive device is particularly space-saving. In addition, the components are arranged very close to the drive machines, so that the busbars and therefore the signal routing via the inverter unit to the drive machines can be kept particularly short. This advantageously results in particularly low-inductance signal routing.

It has proven advantageous when the first and the second power module are arranged symmetrically in relation to one another along the axial direction, so that the side of the second region that faces the first drive machine is structurally identical to the side of the second region that faces the second drive machine. The two sides of the second region are therefore symmetrical in relation to one another. Starting from the first region, the DC signal, which was supplied via the plug-in connector to the filter unit and as a filtered DC signal to the DC link capacitor unit, is split between the two sides of the second region and converted by way of the power modules into the drive machine-specific AC signals. Owing to the structurally identical design of the two sides of the second region, functionally identical busbars of the two sides are of approximately equal length. The functionally identical busbars of the two sides are, for example, those busbars which connect the power modules to the respective drive machine. That is to say, the busbars which connect the first power module to the first drive machine and the busbars which connect the second power module to the second drive machine are of approximately equal length. In addition, those busbars which connect the power modules to the DC link capacitor unit are functionally identical. In other words, the busbars which connect the first power module to the DC link capacitor unit are of equal length to those busbars which connect the second power module to the DC link capacitor unit. The symmetrical arrangement can ensure that energy is transmitted to both drive machines simultaneously.

The drive machines are installed, in particular, in a second direction transversely with respect to the axial direction and have a cylindrical outer geometry. As a result, the intermediate space has a funnel-shaped cross section. A rotation axis of the drive machines, which rotation axis corresponds to a longitudinal axis of the cylindrical outer geometry, is oriented in the second direction on account of the transverse installation. The second direction corresponds, in particular, to the vehicle longitudinal direction, so that the rotation axis is oriented along the vehicle longitudinal direction. The intermediate space, which is formed between the drive machines, is therefore formed in a funnel shape or biconcavely in sections and has inwardly curved, lateral boundaries.

The drive machines are particularly preferably arranged in a common housing, wherein an outer contour of a housing top side follows the cylindrical outer geometries of the drive machines, so that the housing top side has two convex portions, which are formed by the cylindrical outer geometries of the drive machines and are arranged spaced apart from one another, and the intermediate space of funnel-shaped cross section is in the form of a groove-like recess of the housing top side with inwardly curved side walls. The intermediate space is therefore delimited at the bottom by the housing top side of the common housing of the drive machines, so that the first components of the inverter unit can be arranged and held there in a simple manner. Connections of the drive machines for electrical connection to the inverter unit are arranged in the region of an apex of the respective convex portions. The connections are therefore located at the top of the convex portions in a line with the second region. Since the DC link capacitor unit and the filter unit are arranged in a "funnel", which is formed by the first region, between the two electric drive machines, very good electromagnetic insulation of the current is achieved by the solid metal housing of the drive machines.

The embodiments which are presented in relation to the drive device according to the invention and the advantages thereof apply correspondingly to the embodiments of the motor vehicle according to the invention.

Further features of the invention can be found in the claims, the figures and the description of the figures. The features and combinations of features which are mentioned above in the description and the features and combinations of features which are mentioned below in the description of the figures and/or are shown solely in the figures can be used not only in the respectively indicated combination, but rather also in other combinations or on their own.

The invention will now be described in greater detail on the basis of a preferred exemplary embodiment and with reference to the drawings.

DETAILED DESCRIPTION OF THE DRAWINGS

In the figures, identical and functionally identical elements are provided with the same reference signs.

Figure 1:
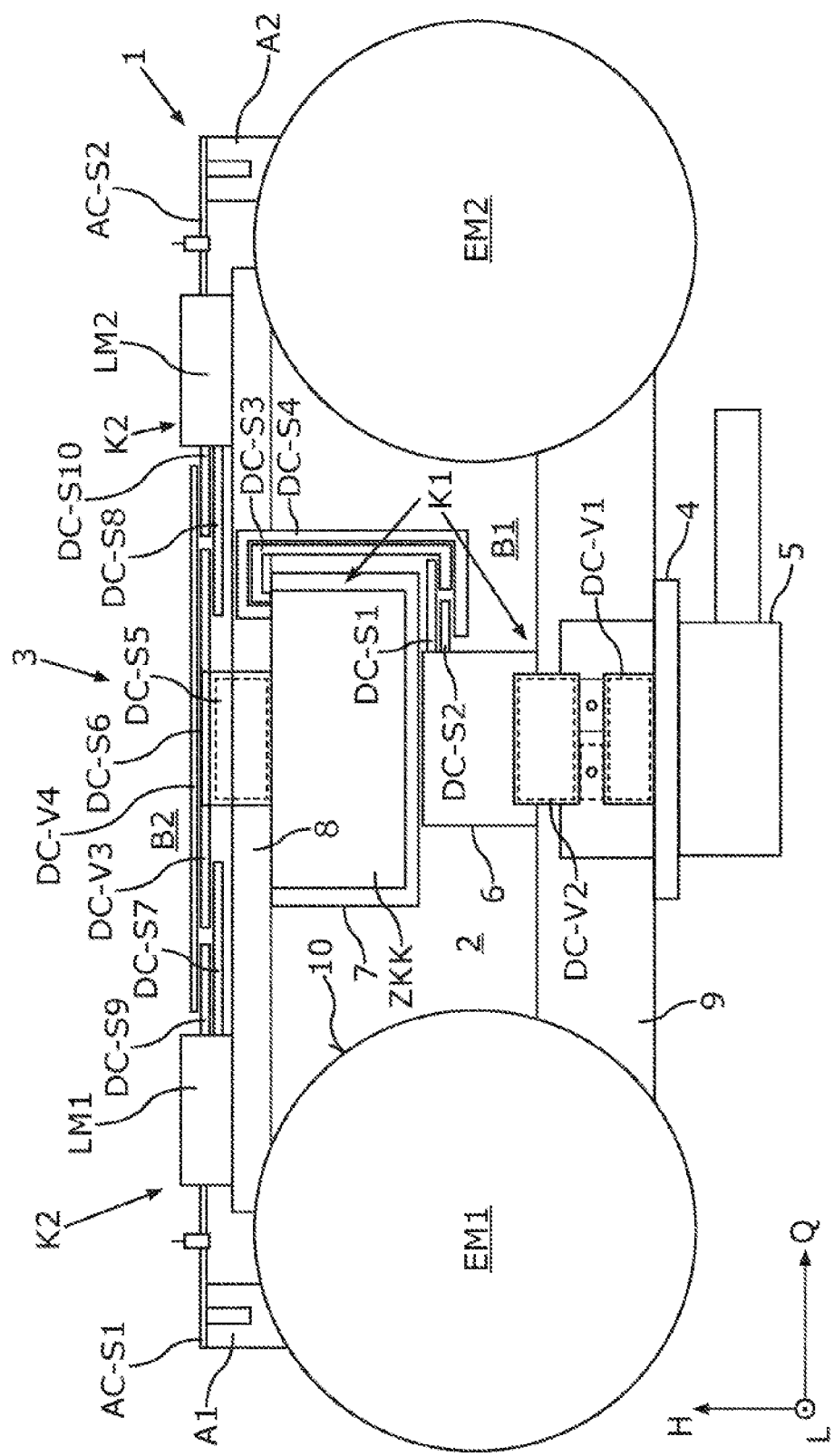
FIG. 1 shows a schematic illustration of a drive device for an electrically drivable motor vehicle.

FIG. 1 shows a drive device 1, which is capable of torque distribution, for an electrically drivable motor vehicle. The electrical drive device 1 has two n-phase drive machines EM1, EM2 which are arranged next to one another in an axial direction Q of an axle of the motor vehicle. The axial direction Q corresponds, for example, to a vehicle transverse direction. The drive machines EM1, EM2 are installed transversely, that is to say their rotation axis or longitudinal axis extends in a direction L (into the plane of the drawing) transversely to the axial direction Q. The direction L corresponds to a vehicle longitudinal direction here. The drive machines EM1, EM2 have a cylindrical outer geometry, so that a funnel-shaped intermediate space 2 forms between them.

In addition, the drive device 1 has an inverter unit 3 which is in the form of a 2*n-phase inverter. The inverter unit 3 is designed to convert an electrical DC variable, which is provided by an energy provision unit, not shown here, of the motor vehicle into a drive machine-specific electrical AC variable. For this purpose, the drive device 1 has a plug-in connector 4 which is electrically connected to a plug 5 of the energy provision unit. The inverter unit 3 has first components K1 which are jointly used by the two drive machines EM1, EM2. Here, the first components K1 are a filter unit 6 in the form of a DC filter and a DC link capacitor unit 7 which has at least one DC link capacitor ZKK. The first components K1 are arranged in a first region B1 of the drive device 1 in the intermediate space 2 and here are arranged along a direction H transversely in relation to the axial direction Q. The direction H corresponds, for example, to a vehicle vertical direction, so that the plug-in connector 4, the filter unit 6 and the DC link capacitor unit 7 are arranged in alignment with one another or one above the other here.

The filter unit 6, which is connected to the plug-in connector 4 via a first DC connecting busbar DC-V1 on the positive side and a second DC connecting busbar DC-V2 on the negative side, is electrically connected to a first DC busbar DC-S1 on the positive side and to a second DC busbar DC-S2 on the negative side. The busbars DC-S1 and DC-S2 are arranged parallel in relation to one another, here in a manner running one above the other along the vehicle vertical direction H. The DC link capacitor unit 7 is electrically connected to a third DC busbar DC-S3 on the positive side and to a fourth DC busbar DC-S4 on the negative side, wherein the busbars DC-S3 and DC-S4 are arranged in a manner running parallel in relation to one another, here in a manner running one above the other along the vehicle vertical direction H. The first DC busbar DC-S1 and the third DC busbar DC-S3 and also the second DC busbar DC-S2 and the fourth DC busbar DC-S4 are electrically connected to one another for interconnecting the filter unit 6 with the DC link capacitor unit 7. The electrical DC variable, which is provided by the energy provision unit, is therefore transmitted via a plug-in connection, which is formed by the plug-in connector 4 and the plug 5, to the filter unit 6 which transmits the filtered DC variable to the DC link capacitor unit 7.

In addition, the inverter unit 3 has second components K2 which are associated with the drive machines EM1, EM2. The second components K2 are arranged in a second region B2 of the drive device 1, wherein the second region B2 is oriented along the axial direction Q. A first of the second components K2 is in the form of a first power module LM1 and a second of the second components K2 is in the form of a second power module LM2. The first power module LM1 is designed to convert the filtered DC variable, which is applied to the at least one DC link capacitor ZKK, into an AC variable for the first drive machine EM1. The second power module LM2 is designed to convert the filtered DC variable, which is applied to the at least one DC link capacitor ZKK, into an AC variable for the second drive machine EM2. In this case, the AC variable for the first drive machine EM1 may be different from the AC variable which is intended to be provided for the second drive machine EM2, depending on the torque which is intended to be provided. For this purpose, the first power module LM1 is electrically connected to a first AC connection area A1 of the first drive machine EM1 via a first AC busbar AC-S1 and the second power module LM1 is electrically connected to a second AC connection area A2 of the second drive machine EM2 via a second AC busbar AC-S2.

The first and the second power module LM1, LM2 are arranged here symmetrically in relation to one another with respect to an axis center, which runs through the first components K1, on a carrier 8, which extends in the axial direction Q. The first components K1 and the second components K2 therefore form a T-shaped inverter architecture which is particularly space-saving on account of the arrangement of the first components K1 in the intermediate space 2. In order to provide the DC signal, which is applied to the at least one DC link capacitor ZKK, to the power modules LM1, LM2, the DC link capacitor unit 7 is electrically connected to a fifth DC busbar DC-S5 on the positive side and to a sixth DC busbar DC-S6 on the negative side. Here, the fifth DC busbar DC-S5 and the sixth DC busbar DC-S6 run in a manner overlapping one another or next to one another along the vehicle longitudinal direction L. The fifth DC busbar DC-S5 is electrically connected to a third DC connecting busbar DC-V3 here and the sixth DC busbar DC-S6 is electrically connected to a fourth DC connecting busbar DC-V4 here. The third DC connecting busbar DC-V3 and the fourth DC connecting busbar DC-V4 are arranged in a manner running parallel in relation to one another in the vehicle vertical direction H, for example in an overlapping manner or one above the other, here. Owing to the parallel course of the busbars, the distance from the busbars, which produces or intensifies a magnetic field and causes electromagnetic interference, is reduced.

The third DC connecting busbar DC-V3 is electrically connected to a seventh DC busbar DC-S7, which is also electrically connected to the first power module LM1, on the side of the first power module LM1 and is electrically connected to an eighth DC busbar DC-S8, which is also electrically connected to the second power module LM2, on the side of the second power module LM2. The fourth DC connecting busbar DC-V4 is electrically connected to a ninth DC busbar DC-S9, which is also electrically connected to the first power module LM1, on the side of the first power module LM1 and is electrically connected to a tenth DC busbar DC-S10, which is also electrically connected to the second power module LM2, on the side of the second power module LM2. The functionally identical busbars AC-S1 and AC-S2, DC-S7 and DC-S8 and also DC-S9 and DC-S10 are, in particular, of equal length. As a result, the current-conducting path runs, starting from the DC link capacitor unit 7, symmetrically to the left in the direction of the first power module LM1 and the first electric drive machine EM1 and also to the right in the direction of the second power module LM2 and the second electric drive machine EM2. Owing to the physically close arrangement of the components K1, K2 of the inverter unit 3 on the drive machines EM1, EM2, a particularly short and therefore low-inductance current transmission path to the drive machines EM1, EM2 can also be formed. The inverter unit 3 is therefore substantially symmetrical and fully integrated.

Figure 2:
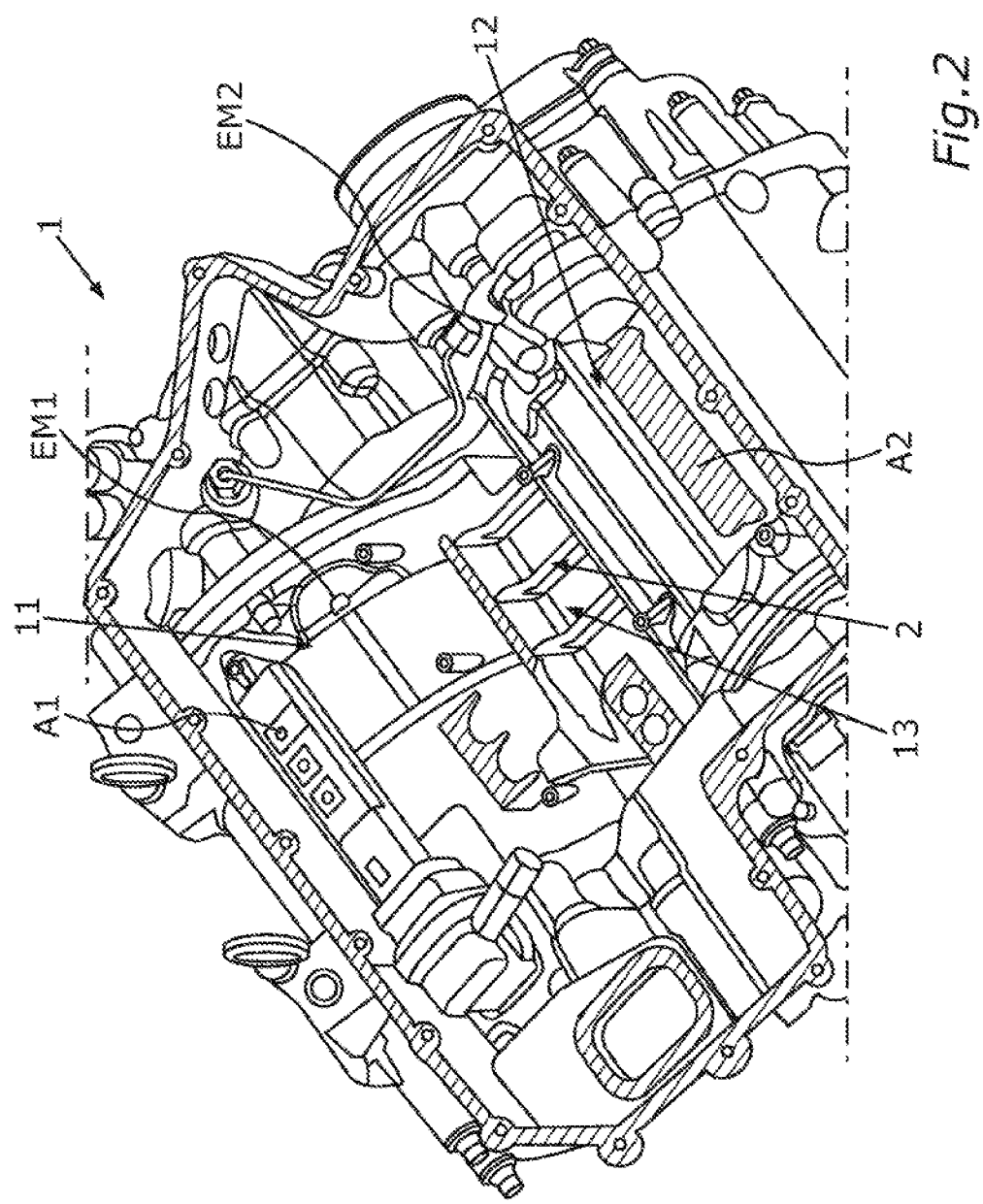
FIG. 2 shows electric drive machines of the drive device in a housing.
Figure 3:
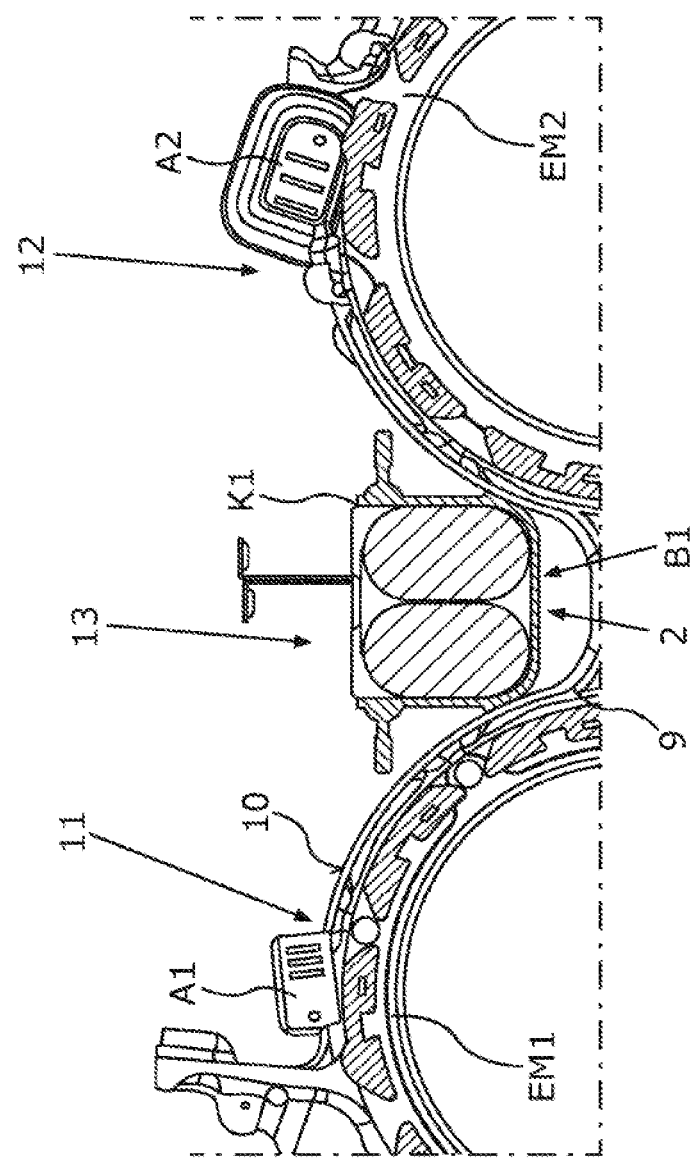
FIG. 3 shows a sectional illustration of the drive device according to FIG. 2.

The electric drive machines EM1, EM2 are, as is also shown in FIG. 2 and FIG. 3, arranged in a common housing 9, wherein a housing top side 10 of the housing has two convex portions 11, 12 on account of the cylindrical outer geometry of the electric drive machines EM1, EM2. A groove-like recess 13, which is funnel-shaped in cross section or is partially biconcave and forms the intermediate space 2 for the first components K1 of the inverter unit 3, is formed between the convex portions 11, 12. The AC connection areas A1, A2 of the electric drive machines EM1, EM2 are formed at the top of the convex portions 11, 12, for example at an apex of the convex portions 11, 12. The sectional illustration according to FIG. 3 shows, by way of example, one of the first components K1 of the inverter unit 3 in the recess 13 which forms the intermediate space 2.

In summary, the drive device 1 exhibits little electromagnetic interference, low thermal losses and increased drive efficiency.

What is claimed is:

1. A drive device for an electrically drivable motor vehicle, the drive device comprising:
   two electric drive machines for distributing torque between two wheels of an axle of the motor vehicle; and
   an inverter which is electrically connected to the drive machines for converting an electrical DC signal, which is provided by an energy provider of the motor vehicle, into a drive machine-specific electrical AC signal, wherein:

the two drive machines are arranged spaced apart from one another in an axial direction to form an intermediate space, wherein the axial direction extends between centers of the drive machines, components of the inverter are arranged in a first region, which is located in the intermediate space and is oriented perpendicular to the axial direction, of the drive device and in a second region, which adjoins the intermediate space and is oriented parallel to the axial direction, of the drive device to form a low-inductance, T-shaped inverter architecture, and at least one of the components of the inverter is arranged along the axial direction between the centers of the drive machines.

2. The drive device according to claim 1,
wherein the drive machines are arranged symmetrically in relation to one another along the axial direction.

3. The drive device according to claim 1, wherein:
the drive machines are n-phase drive machines and the inverter is a 2*n-phase inverter which has, as the components, first components which are jointly usable by both drive machines and drive machine-specific second components, and
the first components are arranged in the first region of the drive device and the second components are arranged in the second region of the drive device.

4. The drive device according to claim 3,
wherein the jointly usable first components are at least one of a filter, a DC link capacitor, or a plug-in connector for connection to the energy provider.

5. The drive device according to claim 3, wherein:
the drive machine-specific second components are power modules for converting the electrical DC signal, which is provided by the energy provider, into the electrical AC signal for the drive machines, a first power module of the power modules for the first drive machine is arranged on a side of the second region that faces the first drive machine, and a second power module of the power modules for the second drive machine is arranged on a side of the second region that faces the second drive machine.

6. The drive device according to claim 5,
wherein the first power module and the second power module are arranged symmetrically in relation to one another along the axial direction, so that the side of the second region that faces the first drive machine is structurally identical to the side of the second region that faces the second drive machine.

7. The drive device according to claim 1,
wherein the drive machines are installed in a second direction transversely with respect to the axial direction and have a cylindrical outer geometry, so that the intermediate space has a funnel-shaped cross section.

8. The drive device according to claim 7, wherein:
the drive machines are arranged in a common housing, and an outer contour of a housing top side of the housing follows the cylindrical outer geometries of the drive machines, so that the housing top side has two convex portions, which are formed by the cylindrical outer geometries of the drive machines and are arranged spaced apart from one another, and the intermediate space of funnel-shaped cross section is in a form of a groove-like recess of the housing top side with inwardly curved side walls.

9. The drive device according to claim 8, wherein:
the drive machines have connections for electrical connection to the inverter, and
the connections are arranged in a region of an apex of the convex portions.

10. An electrically drivable motor vehicle comprising the drive device according to claim 1.

* * * * *